United States Patent
Donohue et al.

[15] 3,688,296
[45] Aug. 29, 1972

[54] TEMPERATURE MONITORING APPARATUS

[72] Inventors: Thomas W. Donohue, Malibu; John Brian Murphy, Pacific Palisades; Thomas B. Bissett, Malibu, all of Calif.

[73] Assignee: The Bissett Berman Corporation, Santa Monica, Calif.

[22] Filed: Aug. 31, 1970

[21] Appl. No.: 68,192

[52] U.S. Cl. ..........340/228 R, 73/362 AR, 307/310, 317/41, 317/141, 324/94, 340/253 R, 340/309.1
[51] Int. Cl. ...........................................G08b 21/00
[58] Field of Search..340/309.1, 227 R, 338 R, 253 R; 307/117; 317/41, 141; 324/94; 73/362 AR

[56] References Cited

UNITED STATES PATENTS

| | | | |
|---|---|---|---|
| 3,561,270 | 2/1971 | Sessler | 73/362 AR |
| 3,248,892 | 5/1966 | Sutton et al. | 307/117 X |
| 3,355,731 | 11/1967 | Jones | 340/309.1 |
| 3,270,560 | 9/1966 | Caveny | 340/262 X |
| 3,543,582 | 12/1970 | Sessler | 73/362 AR X |
| 3,444,439 | 5/1969 | Hoeksema | 324/94 X |
| 2,791,473 | 5/1957 | Mattox | 340/253 X |

Primary Examiner—David L. Trafton
Attorney—Smyth, Roston & Pavitt

[57] ABSTRACT

An electronic time and temperature monitoring apparatus employing the use of electrolytic cells (devices which perform electrolytic plating proportional to the electric charge flowing through the cell), and the inclusion of thermistors with electrolytic cells whereby the electrolytic plating is also controlled by temperature.

14 Claims, 1 Drawing Figure

PATENTED AUG 29 1972
3,688,296
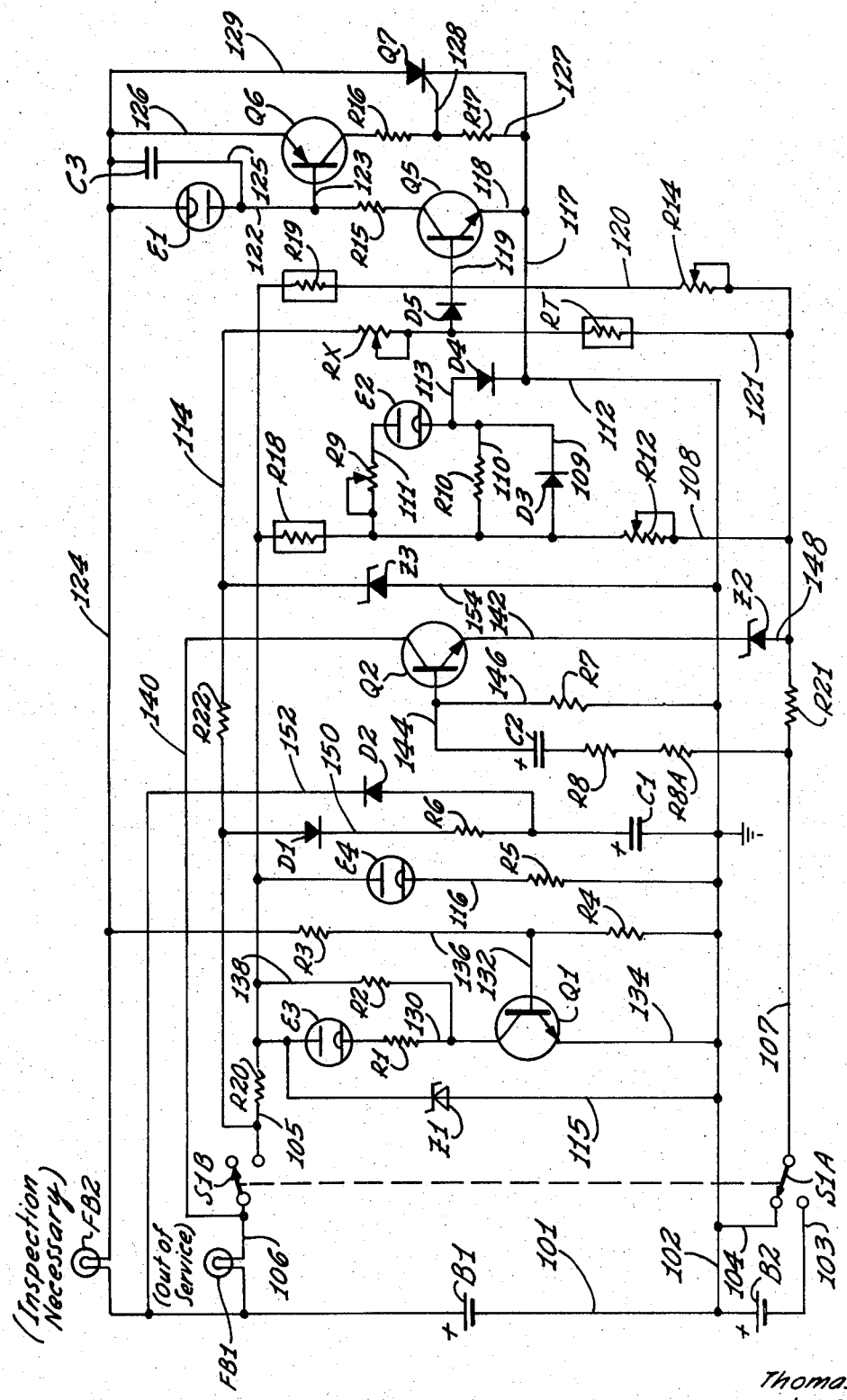
INVENTORS.
Thomas W. Donohue
John Brian Murphy
Thomas B. Bissett
ATTORNEYS

TEMPERATURE MONITORING APPARATUS

BACKGROUND OF THE INVENTION

It is most common to transport perishable consumable commodities from the growing area to be processed or consumed at another location. In the transporting of fruits and vegetables, it is most desirable to have the produce arrive at the destination as fresh as possible. With some produce the freshness can be easily lost. For example, commodities such as lettuce, strawberries, avocados and certain fresh fruits are capable of losing freshness in a relatively short period of time.

It has been known for a good many years that refrigeration tends to retain the freshness of perishable commodities. Therefore, shippers of such commodities have employed refrigerated shipping shipping vehicles to insure to the receiver that the arriving perishable commodities are in the freshest condition possible. However, in the past, through negligence or inadvertence, it has been common to expose the produce to damaging temperatures over a period of time. Yet when the produce is delivered to the receiver, it has been refrigerated at the desired temperature. Frequently, the damage to the produce is not readily perceivable, or if the damage is observed the extent of the damage is difficult to ascertain. If the duration and magnitude of the damage due to exposure was known, frequently a reasonable estimate as to the extent of the damage can be made.

In most instances, it is the obligation of the shipper to be responsible for the damage to the commodity. If only a single shipper was employed, it is easy to place the responsibility. However, frequently a first shipper will transport the produce by truck to a second shipper which continues transporting of the produce by rail or air to a third shipper which is employed to transport the produce to its final destination. If damage occurs to the produce, which shipper is responsible? It is difficult to determine at which point in the shipping process the damage did occur. The receiver can also be sure that the responsive shipper will not step forward. The receiver, then not being able to place the responsibility, must absorb the loss himself.

It would be desirable to employ some form of monitoring apparatus would would be transported along with the commodity which would record the following conditions: (1) The total time of transport; (2) If at any time during transport the temperature has exceeded the upper limit or lower limit of the safe range of temperature for the particular commodity being shipped; (3) If the commodity has been exposed to damaging temperatures, at what point in the shipping procedure did such occur; (4) A measure of the deleterious temperature to which the commodity has been exposed. Also, the monitoring apparatus should include structure to deter unauthorized tampering therewith.

SUMMARY OF THE INVENTION

The monitoring apparatus of this invention is to be operated by an electrical energy source and is a small self-contained portable unit which is readily locatable in the shipping portion of a vehicle.

The monitoring apparatus of this invention employs the use of an electrolytic cell. An electrolytic cell operates by the transfer of an active material such as silver between a pair of electrodes. For example the electrolytic cell may include a first electrode having an outer surface of silver and a second electrode having an outer surface of an inert material such as gold and with the first and second electrodes in contact with an electrolyte. The electrolytic cell away take the form shown in U.S. Pat. No. 3,423,648 issued Jan. 21, 1969 and the electrolyte may be of the type shown in U.S. Pat. No. 3,423,643 issued Jan. 21, 1969. Once activated the silver is plated onto the gold by the phenomenon known as ionization. It is known that the amount of plating varies directly with the electric charge passing through the cell. As the electric charge increases so does the plating in direct proportion thereto.

Within the apparatus of this invention, there are four basically separate electrolytic cell circuits. Within the four electrolytic cell circuit, an electrolytic cell is employed in conjunction with a thermistor. The first electrolytic cell circuit is adjusted to the optimum temperature desired for the particular commodity being transported. As long as the shipped commodity remains at this temperature, no electric current flows through the electrolytic cell. On the temperature rising above this optimum temperature, the thermistor is activated causing electric current to flow through the electrolytic cell thereby permitting electrolytic plating to take place. At the end of transit of the commodity the amount of plating on the electrolytic cell is a measure of the deleterious temperature to which the commodity has been subjected, combined with the time to which it is subjected to a deleterious temperature.

A second electrolytic cell circuit is employed to basically function as a clock in that the second electrolytic cell continues to function as long as the shipment is in transit. At the end of transit by reversing the plating procedure at the same rate at which it was applied, an accurate measure of the total transit time can be made.

A third electrolytic cell circuit also employs the use of a thermistor which is initially set to effect plating of the electrolytic cell only upon temperature of the shipped commodity exceeding above or below a certain range. Activation of the electrolytic cell in this instance is the reverse of previous electrolytic cells in that deplating of the third electrolytic cell occurs. The electrolytic cell has already been preplated a predetermined amount prior to installation. The amount of preplating has been established for the particular commodity so that, if the temperature exceeds above or below the critical range, the electrolytic cell will deplate. If the temperature of the shipped commodity again returns within the desired range, the deplating of the electrolytic cell will stop. If the electrolytic cell becomes completely deplated the entire circuit is opened. At this time a surge of electrical current causes activation of a flash bulb. The flashing of the bulb effects discoloring of a window which has been covered with a heat-sensitive paper. The receiver of the commodity will then know at a glance, that if this window has been blackened, the commodity may have been harmed. The receiver is then warned to take special care in inspecting the commodity.

While the third electrolytic cell circuit warns the receiver that the commodity may have been subjected to possible injury, a fourth electrolytic cell circuit is employed to inform the receiver at what point in the transit these most injurious temperatures have been accumulated. The fourth electrolytic cell circuit has been normally plating at a steady rate since initiation of transit, similar to the second electrolytic cell circuit. However, upon activation of the flash bulb in the third electrolytic cell circuit, the fourth electrolytic cell circuit is also opened thereby stopping the electrolytic plating of the fourth electrolytic cell. Thus, the amount of plating on the fourth electrolytic cell is a measure of the safe transit time, denoting at which point in the transit accumulation of the undesirable temperature or temperatures over a given amount of time proved to exceed established characteristics for the particular commodity.

It is important that once the monitoring device is installed it is not removed or otherwise tampered with during the entire transit procedure. Therefore, once the device is installed an electric charge is supplied to a capacitor. Upon removal of the unit from the installed position, the capacitor will be discharged through a transistor causing activation of a second flash bulb. In a similar manner as previously described the flash bulb causes discoloring of a heat-sensitive paper upon a window. Therefore, if the device has been removed prior to the termination of the transit, it would be readily observed by the receiver upon reaching destination.

BRIEF DESCRIPTION OF THE DRAWING

The FIGURE of the drawing is a schematic of the electrical circuitry employed within the monitoring apparatus of this invention.

DETAILED DESCRIPTION OF THE SHOWN EMBODIMENT

Referring particularly to the drawing, there is shown a schematic of an electrical circuit diagram for the monitoring apparatus of applicant's invention. The monitoring device of applicant's invention is basically divided into four separate electrolytic cell circuits, each electrolytic cell being referred to on the drawing as E-1, E-2, E-3 and E-4. Each of the electrolytic cell circuits are supplied electrical energy from battery sources b-1 and B-2. Conductor 101 electrically connects battery B-1 to conductor 102. Battery B-2 is electrically connected by conductor 103 to one side of switch S1A. A conductor 104 connects the other side of switch S1A to conductor 102. Switch S1B operates to connect conductors 105 and 106 to the positive side of battery B-1. Switches S1A and S1B are ganged to operate simultaneously. With switch S1B in the open position (not permitting conduction from conductor 106 and 105), switch S1A electrically connects conductors 104 and 107. When switches S1A and S1B are moved to their closed position, S1B permits conduction between conductors 105 and 106 with switch S1A connecting conductors 103 and 107 thereby placing battery B-2 within the circuit.

The primary measuring circuit is the E-2 circuit which will now be described. Conductor 102 will be assumed to be at zero potential. The electrical energy from battery B-2 is supplied through conductor 107 into conductor 108. Electrical current then flows through conductor 108 through variable resistor R12 and into parallel conductors 109, 110, and 111. Conductor 109 is connected to diode D3, conductor 110 is connected to resistor R10 and conductor 111 is connected to variable resistor R9. Conductor 112 connects the negative side of conductors 109, 110 and 111, with electrolytic cell E-2 being electrically connected within conductor 112 between resistors R9 and R10. Conductor 113 which includes diode D4 connects conductor 112 with the assumed zero potential conductor 102. Connected with conductor 108 between the connection established between 105 and 111, is a thermistor R18.

Within each electrolytic cell there are two metallic electrodes, one of which includes an active material which is capable of being electrolytically plated upon the other. If electrical current flows in the required direction, electrolytic plating occurs at a proportional rate with respect to the amount of supplied current. If electrical current flows in the other direction through the electrolytic cell, deplating results until all of the active material is deplated at which time conduction of electrical energy between the electrodes does not occur resulting in an open circuit and a rise in voltage across the electrolytic cell. It is readily apparent that if the value of supplied current to the electrolytic cell is known, by merely reversing the plating procedure until an open circuit results, the time to effect such plating has then been determined.

Thermistor R18 is a special type of resistor which varies in resistance inversely with the temperature. For example, if the temperature surrounding the thermistor R18 increases, the resistance of the thermistor R18 decreases. Thermistors are chosen which have a temperature responsive characteristic matching that of the produce to be protected.

Upon installation of applicant's apparatus within the shipping container of the desired commodity, the resistor R12 is adjusted so that the electrical current flowing through electrolytic cell E-2 is zero at the optimum temperature of temperature of the commodity. For example, if it has been determined that it is most desirable to transport avocados at 40° F, adjustment of R12 can be selected so that the voltage drop across R12 coupled with the voltage drop across the thermistor R18 at 40° F. is equal to the entire voltage drop from the conductor 107 to conductor 105. To maintain the voltage drop at a fixed value between conductors 107 and 105, zener Z2 located between conductors 107 and 102 and zener Z1 located between conductors 102 and 105 are employed. Also, zener Z3 connected by conductor 154 between conductors 114 and 102 is employed to maintain a substantially fixed potential therebetween. These zeners have the characteristic of decreasing in resistance with increasing current. Instances of decreasing current, occur most frequently during the latter periods of battery life B1 and B2. Therefore, with a substantially fixed voltage being continually established across resistor R12 and thermistor R18, at 40° F. zero current is conducted through electrolytic cell E-1 resulting in no plating therein. To state the non-flow of current through E-2 in another way, assuming conductor 102 is at zero potential, let it be assumed that zener Z1 through conductor 115 maintains a voltage potential of plus 6 volts of conductor 105 with respect to conductor 102. Let us also assume that zener Z2 maintains a potential of minus 6 volts of conductor 107 with respect to conductor 102. As a result, there is a net difference between conductor 105 and 107 of 12 volts. At 40° F. let it be assumed that the thermistor R18 has an applied voltage of 6 volts. The resistor R12 would be adjusted so as to have a voltage drop of also 6 volts. As a result, the conductor 108 at the point of connection with conductors 109, 110 and 111 would be at zero potential. As conductors 102, 113 and 112 are also at zero potential, there will be no flow of current through resistors R9 and R10 or through diode D3. As a result, no plating would occur within electrolytic cell E-2.

It is noted that if the temperature drops instead of rising thereby causing an increase in the resistance of the thermistor R18, no current would flow through electrolytic cell E-2. If such an arrangement was permitted, the reversing of the current would cause a deplating of the electrolytic cell E-2. Diode D4 does not permit passage of current in this reverse direction. Therefore, no deplating of E-2 occurs.

At the end of transit, the electrolytic cell E-2 is removed and deplated at a predetermined deplating rate. In this way, a measure of degree-hours of deleterious environment to which the commodity has been subjected can be determined, keeping in mind that the measure may not be strictly a linear measure of degree times hours and may be adjusted to a desired characteristic in accordance with the resistance characteristics of the thermistor R18.

The electrolytic cell E-4 is shown located by conductor 116 between conductors 102 and 105. To decrease the applied voltage across the electrolytic cell E-4, resistor R5 is located within conductor 116. It is to be noted that the applied voltage across conductor 116 is maintained relatively constant by means of zener Z1. The purpose of electrolytic cell E-4 is to determine total transit time. Upon the apparatus being installed within the shipping container, e.g., box car, switch S1B is closed thereby creating a potential across conductor 116. The applied voltage is continuously maintained at a constant value until removal of the device from the shipping container and deactivation of switch S1b. The total transit time is calculated by again deplating electrolytic cell E-4 at a predetermined deplating rate upon removal from the monitoring apparatus, because temperature is not a factor and a fixed applied potential is maintained, the measure of the plating upon E-4 is strictly a linear measure of time. Temperature does not enter into the picture as with E-2.

The electrolytic cell circuits of E-1 and E-3 are interconnected in operation. Before operation of the E-3 circuit can result, E-1 circuit must be completely activated. For this reason, the discussion of the E-1 circuit will precede the discussion of the E-3 circuit.

Conductor 117 is connected to zero potential conductor 102. The emitter of transistor Q5 is connected by conductor 118 to conductor 117. The base of transistor Q5 is connected by conductor 119 to both conductors 120 and 121. Diode D5 is located within conductor 119 between the connection therewith of conductor 120 and 121. Conductor 120 is electrically connected to variable resistor R14 and thermistor R19, with conductor 120 located between conductors 107 and 105. Conductor 121 also includes a thermistor RT and a variable resistor RX and is located between conductors 114 and 107. The collector side of transistor Q5 is connected to conductor 122 which includes resistor R15. Conductor 122 is connected to conductor 123 which is electrically connected to the base of transistor Q6. Also, conductor 122 is connected to electrolytic cell E-1 and terminates into conductor 124. Conductor 124 is integrally connected to conductor 101. A capacitor C3 located within conductor 125 is connected on each side of electrolytic cell E-1 between conductors 124 and 122. Conductor 126 connects conductor 124 to the emitter of transistor Q6. Conductor 127 connects the collector of transistor Q6 through resistors R16 and R17 to conductor 117. Conductor 128 is connected to conductor 127 between resistors R16 and R17 and is connected to silicon rectifier Q7. Q7 is located within conductor 129 which is secured between conductors 117 and 124.

The operation of the circuit of electrolytic cell E-1 is as follows: By the employment of transistor Q5, a predetermined value of bias must be created on conductor 119, which is connected to the base of transistor Q5, prior to rendering of Q5 conductive. The rendering of bias on conductor 119 can be accomplished by current being supplied either through conductor 120 or 121. It is to be noted that electrolytic cell E—1 is different from the previous cells in that it has already been preplated a predetermined amount. The reason for this will become readily apparent in the following description.

In the manner as previously described with the electrolytic cell circuit of E-2, resistors R14 and RX are adjudged in view of their respective thermistors R19 and RT so that the zero potential is applied to conductor 119. This is accomplished at the optimum temperature for the particular commodity that is being shipped. Upon the ambient temperature increasing to which R19 is subjected, the resistance of thermistor R19 drops causing a potential to be created on conductor 119 and applied to base of the transistor Q5. Upon the potential on conductor 119 reaching a predetermined level, conduction of transistor Q5 occurs, causing current to be conducted within conductor 122 to electrolytic cell E-1. As a result, electrolytic cell E-1 begins to deplate at a steady amount. As long as tee temperature of thermistor R19 stays above the point which causes transistor Q5 to conduct, E-1 will steadily deplate. If the ambient temperature of the thermistor R19 decreases below this critical point, the deplating of E-1 will cease. If the temperature of the thermistor R19 again rises above this critical point, the deplating of E-1 will again resume.

If the temperature drops below a predetermined value, thermistor RT increases in resistance. Because of the location of thermistor RT with respect to thermistor R19 (on the positive side of conductor 119 where thermistor R19 is located on the negative side), a potential is again applied within conductor 119 to the base of transistor Q5. The direction of this bias is insured to be in the same direction due to diode D5. Again, upon the bias exceeding a predetermined level, deplating of E—1 is initiated or continues.

The amount of plating which has been preplated upon electrolytic cell E-1 has been selected in view of the particular commodity that is being shipped, so that upon the commodity being exposed to excessive temperatures for a sufficient length of time to effect complete deplating of E-1, there is a good possibility that permanent damage has resulted to the commodity.

This fact is called to the immediate attention of the receiver upon receiving the commodity, as follows:

Once the electrolytic cell E-1 is completely deplated, its resistance abruptly increases; in other words, it opens circuits. At this time, transistor Q6 becomes conductive. During deplating of electrolytic cell E-1, the emitter side 126 of transistor Q6 and the base 123 have been at the same potential due to conductors 122 and 124. As a result, no current could flow therebetween. However, upon opening circuiting of conductor 122 by means of electrolytic cell E-1, transistor Q6 becomes conductive due to the potential created between conductors 123 and 126. Upon transistor Q6 becoming conductive, current is supplied through conductors 127 and 128 to silicon-controlled rectifier Q7. Q7 functions in the same manner as a switch in that upon becoming operative, a surge of current is transmitted through a conductor 129 and into conductor 124. A flash bulb RB2 is located within conductor 124 and, upon activation of Q7, the entire nine-volt potential of battery B1 is applied across flash bulb FB2, causing operation thereof. Upon flash bulb FB2 flashing brilliantly opening the circuit, the brilliant flash therefrom reacts against a heat-sensitive paper which has been applied to a section of glass. The glass is located so that it could be readily observed by a receiver exteriorly of the apparatus. When this window is thus blackened, the receiver of the commodity knows that the temperature of the commodity has gone above or below a predetermined range and has accumulated sufficient time exteriorly of the range for a good chance that damage to the commodity may result. The receiver of the produce is alerted to the fact to the fact that his commodity may have been and it therefore warns him to take special care in inspecting the produce prior to acceptance. In a similar vein, if the commodity is such that inspection cannot readily reveal at once whether there has been damage, it warns him that he should dispose of this commodity promptly since it may have been subjected to deleterious temperatures.

While the flashing of flash bulb FB2 indicates to the receiver that the commodity may have been subjected to possible damaging temperatures, it does not inform him at what point in the transit the accumulation of the damaging temperatures occurred. Such information would be needed to place the responsibility upon a particular shipper where a plurality of shippers are employed. It is the function of electrolytic cell circuit E-3 to report the point in time in transit in which the flashing of flash bulb FB2 occurred.

Electrolytic cell E-3 is connected through conductor 130 to the collector side of transistor Q1. The emitter side of transistor Q1 is connected through conductor 134 to the zero potential conductor 102. The base portion of the transistor Q1 is connected through conductor 132 to conductor 136 which is connected between conductors 124 and the zero potential conductor 102. As only a small amount of potential is required to operate electrolytic cell E-3, resistor R1 is located within conductor 130 and conductor 138 containing resistor R2 is located on each side of electrolytic cell E-3. Until flash bulb FB2 flashes, the nine-volt potential of battery B1 is applied across conductor 136 with the potential being divided between resistors R3 and R4. Therefore, a potential is created between conductors 132 and 134 between the base and emitter of transistor Q1, resulting in an electric current being conducted through conductor 130 into electrolytic cell E-3, resulting in a plating of E-3. As long as the E-1 circuit has not been opened, the electrolytic cell E-3 will continue to plate.

When the flash bulb FB 2 flashes and opens circuits, due to the connection of conductor 124 with conductor 136, conductor 136 is also open circuited. As a result, the base 132 and the emitter 134 of the transistor Q1 are placed at the same zero potential. Therefore, conduction of current within conductor 130 is stopped, resulting in a stopping of the plating action within electrolytic cell E-3. Thus, be deplating the amount of plating of the electrolytic cell E-3, an accurate measure of the safe transit time is calculated. Therefore, the receiver of the commodity can tell how long after the monitoring device was installed until flash bulb FB2 was operated. The flash bulb FB2, therefore, provides for a visual indication and also serves to open the circuit to electrolytic cell E-3. This pinpoints which shipper had responsibility for the commodity at that time.

It is readily apparent apparent that many shippers would find the inclusion of such a device as previously described within the shipping container to be undesirable. The obvious reason for such undesirability would be that they can be held responsible for exposing the particular commodity to damaging temperatures. The most common way a shipper can prevent having the temperature of the commodity monitored would be merely removing the apparatus from the installed position, opening switches S1A and S1B. The shipper would then reinstall the apparatus prior to the delivery of the commodity to the receiver, thereby giving inaccurate readings to the receiver.

Applicant, in order to avoid such tampering with the apparatus, has incorporated a tamper circuit within his apparatus so that once the apparatus is installed, if it has been removed prior to arriving at its destination, such will be known by the receiver. A flash bulb FB1 is located within conductor 106 with conductor 106 being connected to conductor 140 which is connected to the collector side of transistor Q2. The emitter side of transistor Q2 is connected by conductor 142 to zero potential conductor 102. The base of transistor Q2 is connected by conductor 144 to capacitor C2 with resistors R7 and R7A also being located within conductor 144 prior to connection to conductor 107. A resistor R7 is located between conductor 144 adjacent transistor Q2 and zero potential conductor 102. Resistor R7 is electrically connected therebetween by conductor 146. A resistor R21 is located within conductor 107 in between the connection therewith of conductor 144 and conductor 148 for zener Z2. Conductor 148 connects conductor 107 with zero potential conductor 102. Also, a conductor 150 includes diode D1, resistor R6 and capacitor C1, with conductor 150 connecting conductors 102 and 114. Conductor 152 is electrically connected to conductor 150 between R6 and capacitor C1. Conductor 152 is connected to diode D2 prior to connection to conductor 101. Before the closing of switches S1A and S1B, the transistor Q2 is not operating since the collector side of the transistor through conductor 140 is connected to the open side of switch S1B. With the closing of switches S1B and S1A, the potential of battery B2 is conducted to capacitor C2 through resistors R7, R8 and R8A. The potential on capacitor C2, however, is such as to maintain transistor Q2 in the non-operative position.

Also, a charge is placed upon capacitor C1 from battery B1 upon closing of switches S1B and S1A. Upon the reopening of switches S1A and S1B, capacitor C2 discharges through resistors R7, R8 and R8A, placing a conducting pulse on the base of transistor Q2. Transistor Q2 conducts through conductor 140 to flash bulb FB1, causing flashing of such and opening the circuit. In a manner as described with the previous flash bulb FB2, FB1 causes a blackening of a window coated with a heat-sensitive paper. Therefore, if the monitoring apparatus has been removed at any time during transit, after initial installation, upon receipt by the receiver of the produce such fact would be instantly known to the receiver. Also, the time at which this occurred would be known, since the flash bulb FB2 opens circuits when it is flashed and this open circuit discontinues the application of energy to the electrolytic cell E-3 to thereby provide a measure of the time when the flash bulb FB2 has been actuated.

It has been found in practice that it is not sufficient to rely upon the voltage from battery B2 by itself to flash the flash bulbs. Therefore, the flash current is supplemented by the discharge of C1 by way of conductor 152 through diode D2.

While it is to be understood that numerous values could be assigned for the resistors and capacitors employed within applicant's apparatus, the following examples of a set of values which have been proven to be satisfactory. It is to be understood that the batteries B1 and B2 are each to supply a potential of 9 volts. All the resistors are one-fourth watt, 10 percent carbon. All 1-percent resistors are metal film of which resistors R1, R5 and R10 are of that variety. The values for the resistors and capacitors are as follows:

```
C1-15v-200 micro f
C2-15v-39 micro f
C3-05     micro f
R1-10 meg
R2-270K
R3-2.7 meg
R4-330 K
R5-10 meg
R6-22K
R7-22K
R8-10 ohms
R8A-10 ohms
R9-100k
R10-22.6K
R12-500K
R14-500K
R15-1 meg
R16-1K
R17-680 ohms
R18-100K
R19-100K
R20-18K
R21-18K
R22-18K
RX-500K
RT-100K
```

Whereas the present invention has been shown and described herein in what is conceived to be the best mode contemplated, it is recognized that departures may be made therefrom within the scope of the invention which is, therefore, not to be limited to the details disclosed herein, but is to be afforded the full scope of the invention.

We claim:

1. A monitoring apparatus comprising:
a first electrolytic plating cell capable of plating at a predetermined rate;
a source of electrical energy for applying an electrical current to said first cell;
a thermistor controlling the application of electrical current to said first cell, said thermistor decreasing in electrical resistance upon increase of ambient temperature, thereby causing an increase of plating of said first cell upon increase of the ambient temperature; and
adjustable means electrically connected with said first cell and said thermistor, said adjustable means capable of being adjusted at a predetermined ambient temperature to apply substantially zero electric potential to said first cell.

2. Apparatus as defined in claim 1 wherein:
said adjustable means including a variable resistor said variable resistor being adjustable to a plurality of ambient temperatures so that the electrical potential that is applied to said first cells is zero in each instance.

3. Apparatus as defined in claim 1 including:
tampering indicating means associated with said source, a visual indicating means actuatable by said tampering indicating means, upon removing said source from the electrical conductive relationship with said first cell said tampering indicating means causes actuation of said visual indicating means.

4. A monitoring apparatus comprising:
a source of electrical energy;
a first circuit including a first electrolytic plating cell capable of plating at a predeterminably rate, said source supplying electrical energy to said first circuit, a first thermistor located within said first circuit controlling the application of electrical energy to said first cell, a variable resistor located within said first circuit cooperating with said first thermistor, said variable resistor being adjustable in view of an established resistance determined by a particular ambient temperature to apply zero electrical current to said first cell;
a second circuit including a second electrolytic plating cell capable of deplating at a predetermined rate, said source supplying electrical energy to said second circuit, a first transistor located within said second circuit to effect a constant application of electrical current to said second cell upon the ambient temperature exceeding a predetermined value range, a second thermistor located wthin said second circuit controlling the application of electric potential to said first transistor a second transistor located within said second circuit being electrically conductive upon complete deplating of said second cell, said second transistor causing activation of a visual indicator;
a third circuit including a third electrolytic plating cell capable of plating at a predeterminable rate, said source supplying electrical energy to said third circuit, said third cell being activated upon activation of said source, said third cell being deactivatable by completion of deplating of said second cell; capable of plating at a predeterminable rate, a constant value of electric current being supplied through said fourth cell being activated upon activation of said source, said fourth cell only being deactivated by deactivation of said source; and tampering indicating means associated with said source, a visual indicating means actuable by said tampering indicating means, upon removing said source from the electrical conductive relationship with said first cell said tampering indicating means causes actuation of said visual indicating means.

5. A monitoring apparatus comprising:

a first electrolytic plating cell capable of plating at a predetermined rate;

a source of electrical energy for applying an electrical current to said first cell;

a thermistor controlling the application of electrical current to said first cell, said thermistor decreasing in electrical resistance upon increase of ambient temperature, thereby causing an increase of plating of said first cell upon increase of the ambient temperature;

a second electrolytic plating cell capable of deplating in a predeterminable rate;

a source of electrical energy for supplying an electrical current to said second cell; and first means to effect deplating of said second cell upon the ambient temperature exceeding a predetermined value range.

6. Apparatus as defined in claim 5 wherein:

said first means includes a first transistor assembly, said first transistor assembly effecting a steady application of electrical current to said second cell upon the ambient temperature exceeding said value range; and said first means further including a temperature indicating means to effect operation of said first transistor assembly.

7. Apparatus as defined in claim 6 wherein:

said temperature indicating means includes a first thermistor assembly, said first thermistor assembly causing operation of said first transistor assembly upon sufficient increase of the ambient temperature.

8. Apparatus as defined in claim 7 wherein:

said temperature indicating means further includes a second thermistor assembly causing operation of said first transistor assembly upon sufficient decrease of ambient temperature.

9. Apparatus as defined in claim 8 including:

visual indicating means operable by said second plating cell upon complete deplating of said second cell.

10. Apparatus as defined in claim 9 wherein:

said visual indicating means being operated by a second transistor assembly.

11. Apparatus as defined in claim 10 wherein:

said second transistor assembly including a second transistor and a silicon diode rectifier, said second transistor causing actuation of said rectifier resulting in activation of said visual indicating means.

12. Apparatus as defined in claim 11 wherein:

said visual indicating means includes a flash bulb, upon activation of said flash bulb an observable heat-sensitive paper is discolored.

13. A monitoring apparatus comprising:

a first electrolytic plating cell capable of plating at a predeterminable rate;

a source of electrical energy for applying an electrical current to said first cell;

a thermistor controlling the application of electrical current to said first cell, said thermistor decreasing in electrical resistance upon increase of ambient temperature, thereby causing an increase of plating of said first cell upon increase of the ambient temperature;

a second electrolytic plating cell capable of deplating at a predeterminable rate;

a source of electrical energy for supplying an electrical current to said second cell;

first means to effect deplating of said second cell upon the ambient temperature exceeding a predetermined value range;

a third electrolytic plating cell capable of plating at a predeterminable rate, said third cell being activated immediately upon activation of the entire monitoring apparatus; and second means supplying a constant value electrical potential to said third cell, said second means being deactivated from supplying electrical current to said third cell upon completion of the deplating of said second cell.

14. Apparatus as defined in claim 13 wherein:

a fourth electrolytic plating cell capable of plating at a predeterminable rate, a constant value of electric current being supplied through said fourth cell, said fourth cell being activated immediately upon activation of the entire monitoring apparatus, said fourth cell only being deactivatable by deactivation of the entire monitoring apparatus.

* * * * *